Figure 1:
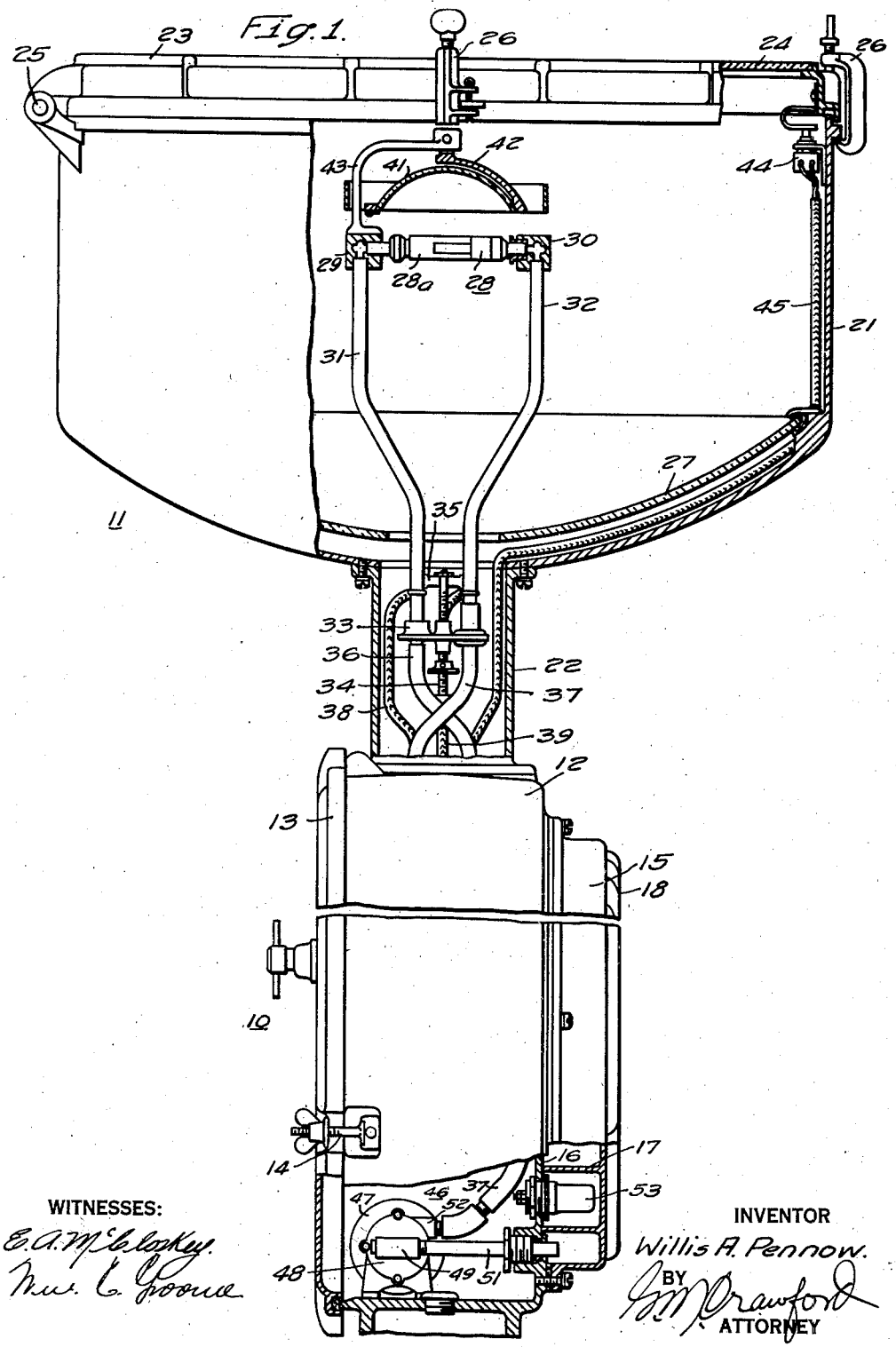

Dec. 17, 1946.    W. A. PENNOW    2,412,907

CONTROL SYSTEM AND APPARATUS FOR LAMPS

Filed April 29, 1943    2 Sheets-Sheet 2

WITNESSES:
E. A. McCloskey
Wm. C. Groome

INVENTOR
Willis A. Pennow.
BY
Crawford
ATTORNEY

Patented Dec. 17, 1946

2,412,907

UNITED STATES PATENT OFFICE 2,412,907

CONTROL SYSTEM AND APPARATUS FOR LAMPS

Willis A. Pennow, Cleveland, Ohio, assignor to Westinghouse Electric Corporation, East Pittsburgh, Pa., a corporation of Pennsylvania Application April 29, 1943, Serial No. 485,021

13 Claims. (Cl. 315—116)

My invention relates, generally, to control systems and apparatus for electric lamps and, more particularly, to a control system and cooling apparatus embodied in a self-contained control and cooling unit particularly adapted for use with electric lamps of the type which are cooled by circulating a cooling medium therethrough during operation.

Heretofore, attempts have been made to utilize the high efficiencies and great light flux concentrations of such lamps, of which the water-cooled high intensity mercury vapor lamp is one example, in search-lights and the like, but such attempts have not been entirely successful as large and cumbersome auxiliary equipment has been required and, in most instances, it has been necessary to use a separate water supply for cooling purposes.

In many instances it is necessary or desirable to use such lighting apparatus in the open and under all weather conditions. Attempts to use cooling liquids having low freezing points have not met with success for the reason that such liquids undergo chemical changes, due to the high short-wave emissions of such light sources of lamps, and either deposit solids on the lamp and cooling jackets thus greatly reducing the light output, or decompose to such extent that the freezing point is raised to a point where protection against freezing is no longer afforded.

Accordingly, it is an object of my invention, generally stated, to provide apparatus for controlling and cooling a liquid cooled lamp, or the like, which shall be of simple and economical construction, and which shall function to automatically control the energization of the lamp in accordance with the temperature of the cooling liquid and also maintain the cooling liquid within a proper range of operating temperatures regardless of the weather conditions to which it is subjected.

A more specific object of my invention is to provide a self-contained control and cooling controller unit for use with liquid-cooled lamps.

Another object of my invention is to provide a self-contained controller unit for liquid-cooled lamps embodying the necessary electrical control apparatus for controlling the energization of the lamp and a closed circulating system including a reservoir-radiator compartment provided with heating means to maintain the temperature of the cooling liquid above the freezing point.

A further object of the invention is to provide a self-contained controller unit of the character described wherein the electrical control apparatus is so interlocked with the circulating system that the lamp can be energized only when the cooling liquid is within its proper operating temperature range and the proper flow maintained and which shall function at all times to prevent the cooling liquid from freezing.

Another object of my invention is to provide a controller of the character described in which water may be used as the cooling medium without danger of freezing and which does not require a separate or outside source of water supply.

Figure 2:
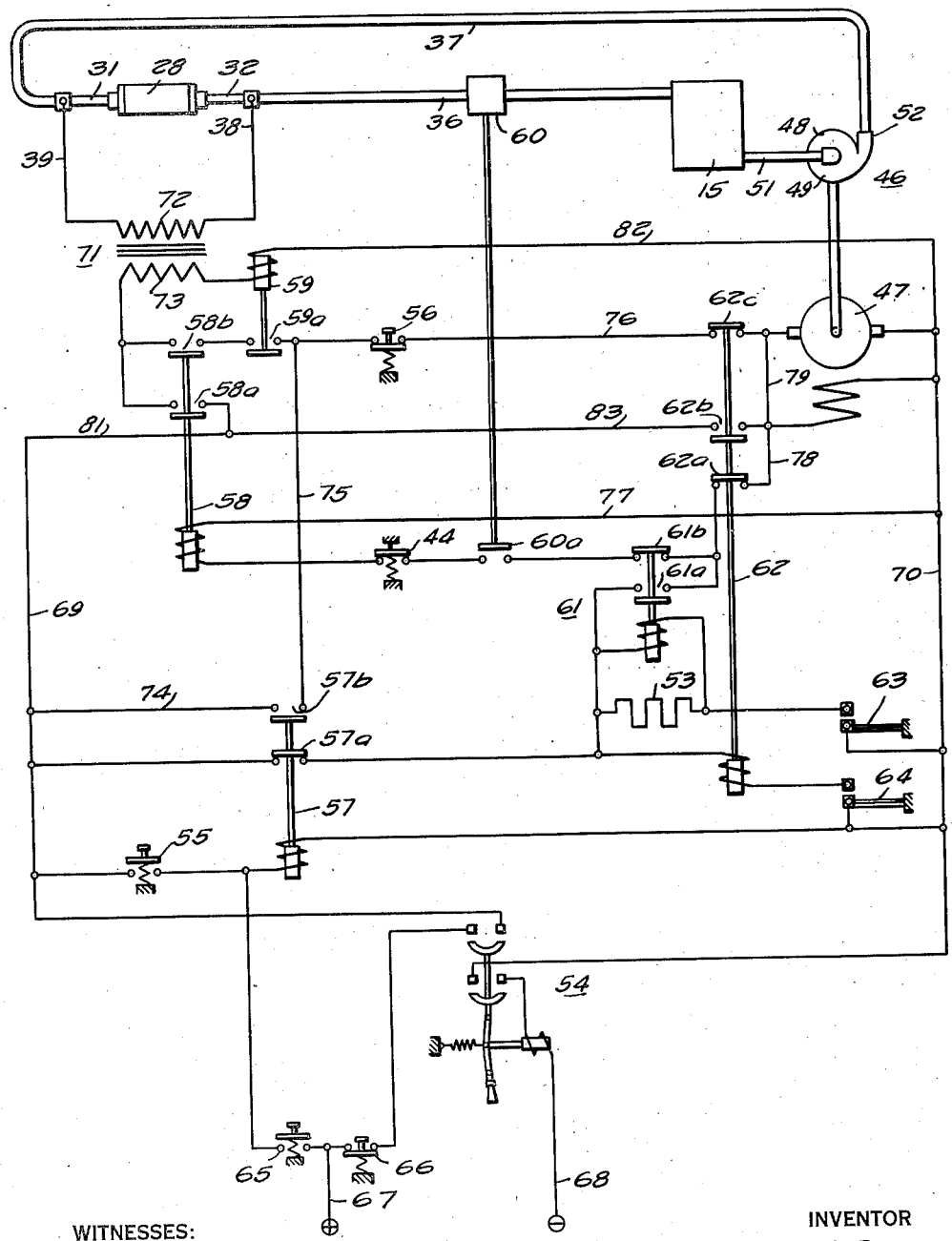

These and other important objects and principles of my invention will become more apparent from the following detailed description of one embodiment thereof when read in conjunction with the drawings in which:

Figure 1 is a side elevational view of a controller embodying the principal features of my invention, certain parts being broken away and others shown in section to illustrate details, and Fig. 2 is a diagrammatic view of the electrical circuits and apparatus and the circulating system of the controller of Fig. 1 showing its cooperative relationship with the lamp.

My invention will be described as it may be applied to a light unit in the form of a searchlight projector suitable for use in determining ceiling heights for airports although it is to be understood that its use is not so limited. In this instance, the projector is mounted on the controller to provide a unitary assembly ready for connection to a current source.

Referring to Fig. 1 of the drawings, the controller is indicated generally by the numeral 10 and the searchlight or projector by 11. The controller comprises a housing or casing 12 of weatherproof construction having a front door 13 which may be secured to the housing by means of hinges (not shown) and fastening devices 14.

A labyrinth radiator 15 is attached to the back wall 16 of the housing and functions therewith to provide a reservoir for the cooling liquid, which is hereinafter referred to as the reservoir-radiator. As shown in Fig. 1, the labyrinth structure is formed by the transverse members 17 which produce a transverse flow of the cooling liquid while heat radiation is from vertical surfaces. The radiator 15 may also be provided with a plurality of spaced vertical fins 18 on the face thereof.

The projector 11 comprises a body or drum 21 mounted on the housing 12 by means of a tubular connector 22, and provided with a hinged door 23, including a lens 24, attached to the drum by means of a hinge 25 and a plurality of spaced clamps 26. A main reflector 27 is mounted at the bottom of the drum.

The liquid-cooled lamp 28 of the type having a water jacket 28a, is mounted within the drum in sockets 29 and 30 supported by the metal tubes 31 and 32 forming a part of the circulating system. These tubes function to carry the cooling liquid as well as electric conductors for the energizing circuit of the lamp. The lamp and tube assembly is supported by means of a spider 33 carried by an adjusting screw 34 rotatably mounted on a boss 35 on the winding of the connector 22.

The tubes 31 and 32 are connected to the other parts of the circulating system within the housing by flexible tubes 36 and 37 and are connected to the control circuits and apparatus within the housing by conductors 38 and 39 attached to the lower ends of the tubes as shown.

In this instance, the projector is also provided with a secondary reflector 41 supported by a holder 42 attached to a bracket 43 mounted on the socket 29.

A door switch 44 is provided as a part of the control circuit and connected therewith through a conductor cable 45.

Referring again to the controller 10, the circulating system also includes a motor-operated circulating pump 46 comprising, a motor 47 and pump 48, mounted within the housing 12 and connected in the circulating system as shown in Fig. 1. The intake port 49 of the pump is connected to the bottom of the radiator-reservoir through a suitable nipple 51 so as to draw cooling liquid from the lower part of the radiator-reservoir while the outlet port 52 is connected to the lower end of the flexible tube 37 so that the cooling liquid is circulated up through the metal tube 32, through the jacket of the lamp, down through the other metal tube 31 and through the flexible tube 36 into the top of the radiator through another control device which will be described hereinafter in connection with Fig. 2.

In order to provide for maintaining the temperature of the cooling liquid above a predetermined minimum value, or above freezing temperature, the controller is also provided with an electric immersion heater 53 which may be mounted on the back wall 16 of the housing and extending into the radiator-reservoir as shown in Fig. 1. The electrical connections of this heater will be described hereinafter with reference to Fig. 2.

Referring to Fig. 2 of the drawings, there is shown a diagrammatic view of the control circuits and apparatus embodied in the controller of Fig. 1, including the lamp 28, motor operated pump 46 and other devices which have been described in connection with Fig. 1.

Within the controller housing there is mounted a main circuit breaker 54, start and stop push button switches 55 and 56, a control relay 57, a control switch 58, a plurality of auxiliary control relays 59, 61 and 62, a pair of thermal switches or relays 63 and 64 and a flow switch 60. In addition to the start and stop switches 55 and 56 mounted within the housing, another pair of such switches 65 and 66 may be mounted outside of the housing if desired for remote control purposes.

The main switch 54 is for the purpose of connecting the controller to a source of current which, in this instance, is designated by the conductors 67 and 68. When the main switch is closed, it energizes the circuits of the controller and makes possible the operation of the lamp and other devices.

The start and stop switches 55 and 56 are for the purpose of manually controlling the operation of the lamp 28 and are accessible through the door opening of the housing.

When the main switch 54 is closed, the main conductors 69 and 70 of the controller are energized. The lamp 28 and the various switches and relays of the system are energized from these conductors in response to the operation of the start switch 55.

The lamp 28 is energized from conductors 69 and 70 through a step-up transformer 71 having its secondary winding 72 connected to the lamp terminals and its primary winding 73 connected to conductors 69 and 70 through contact members 58a of the control switch 58.

In order to assure that the proper flow of cooling liquid is circulating through the lamp before it is energized, the flow switch is connected in the circulating system as shown, and is provided with contact members 60a which must be closed before the control switch 58 can be energized to connect the primary winding 73 of the transformer to the energized conductors 69 and 70.

The electric immersion heater 53 referred to in connection with Fig. 1 is controlled by the thermal switch 63 which functions to energize the heater when the temperature of the cooling liquid decreases below a predetermined value. The energizing circuit for the heater extends through the normally closed contact members 57a of the control relay 57 and, therefore, it is apparent that this circuit may be completed at any time this relay is in its normal deenergized position.

The thermal switch 64 functions in response to the temperature of the cooling-liquid exceeding a predetermined value to energize auxiliary relay 62 through the contact members 57a of the control relay for the purpose of effecting deenergization of the lamp 28 and maintaining the motor-operated pump 46 in operation.

The thermal relay 63 also controls the operation of auxiliary relay 61 which closes its contact members 61a to maintain the motor-operated pump 46 in operation and opens its contact members 61b to deenergize the lamp and to prevent energization of the lamp in the event that the temperature of the cooling liquid is below a predetermined value as determined by the setting of relay 63.

In the operation of the system, when the start switch 55 is closed, an obvious energizing circuit for the control relay 57 is established. The closure of contact members 57b thereof energizes the pump motor 47 over a circuit extending from conductor 69 through conductor 74, contact members 57b, conductor 75, stop switch 56, conductor 76, normally closed contact members 62c and the armature of motor 47 to conductor 70. This initiates the operation of the circulating pump 48 which establishes a flow of cooling liquid through the circulating system and the water jacket of the lamp 28.

As soon as the flow attains a predetermined volume, the flow switch 60 operates to close its contact members 60a to establish an operating circuit for the control switch 58. This circuit extends from conductor 70 through conductor 77, winding of switch 58, door switch 44, contact member 60a, contact members 61b, contact members 62a, conductors 78 and 79, contact members 62c, conductor 76, stop switch 56, conductor 75, contact members 57b and conductor 74 to conductor 69. At this time, contact members 57b of the control relay 57 are closed as the start switch 55 is held closed until the lamp is lighted.

The closure of control switch 58 energizes the primary winding 73 of the transformer through a circuit extending from conductor 69 through conductor 81, contact members 58a, primary winding 73, winding of the auxiliary relay 59, and conductor 82 to conductor 70. Contact members 58b of control switch 58 are also closed at this time but are not effective until after the closure of auxiliary relay 59.

In the event that the lamp 28 is in normal operating condition, sufficient current will flow through the primary winding 73 to effect operation of the auxiliary relay 59 causing its contact members 59a to be closed. The closure of the auxiliary relay 59 establishes the main energizing circuit for the motor 47 and also the holding circuit for the control switch 58. This circuit extends from conductor 69 through conductor 81, contact members 58a, 58b and 59a, stop switch 56, conductor 76, contact members 62c and armature of motor 47 to conductor 70.

It will now be noted that this circuit depends for its continuity upon several operating conditions. Since it contains contact members 58a and 58b of the control switch 58, which is under the control of the flow switch 60, it will be interrupted in the event that the volume of flow of cooling liquid decreases below a predetermined value. Likewise, since it contains contact members 59a of auxiliary relay 59, it will be interrupted in the event that the lamp 28 fails or something occurs which causes an abnormal current to flow through the primary winding 73 of the transformer. This circuit also contains contact member 62c of auxiliary relay 62, which is under the control of the thermal relay 64, so that it will be interrupted in the event that the temperature of the cooling liquid exceeds a predetermined value. The normally closed stop switch 56 is also in this circuit and is effective to interrupt it at will of the operator.

This is the normal operating condition of the circuits. In the event that the temperature of the cooling liquid exceeds a predetermined value, it is desired to discontinue operation of the lamp 28 and continue the operation of the motor-operated pump 46 in order that the cooling liquid will be circulated and cooled. This is effected through the operation of thermal relay 64 and auxiliary relay 62 as referred to hereinbefore.

As soon as relay 62 is energized, its contact members 62c open the main energizing and holding circuit just described and deenergizes the control switch 58 and transformer 71, and its contact members 62b are closed to establish a new energizing circuit for the pump motor 47. This circuit extends from conductor 69 through conductors 81 and 83, contact members 62b and armature of the motor 47 to conductor 70. This circuit will maintain the motor in operation until such time as the thermal relay 64 opens to deenergize relay 62.

The reclosure of contact members 62c, however, will not effect a re-energization of the lamp for the reason that auxiliary relay 59 has opened its contact members 59a and these contact members cannot be closed until the start switch 55 has again been actuated to energize the control relay 57 to again start the motor-operated pump and bring about the operation of the control switch 58 as described hereinbefore.

In the event that the temperature of the cooling liquid decreases below a predetermined value, either during the time the lamp 28 is in operation or is not in operation, the thermal relay 63 will function to energize the heater 53 as described hereinbefore and also the auxiliary relay 61 to close an energizing circuit for the pump motor 47 from conductor 69 through contact members 57a of the control relay, contact members 61a and 62a to conductor 70.

When relay 61 is energized, its contact members 61b are opened and since these contact members are in series with the contact members 60a of the flow switch 60 in the energizing circuit of the control switch 58, it is apparent that the control switch 58 cannot be energized to energize the transformer 71 during the time the auxiliary relay 61 is energized. This prevents the energization of the lamp 28 by operation of the start switch 55 in the event that the temperature of the cooling liquid is too low and also automatically deenergizes the lamp in the event that the temperature of the cooling liquid becomes too low while the lamp is in operation.

The thermal relays 63 and 64 may be of any suitable type and, in practice, are mounted upon the back of the controller housing so as to be responsive to the temperature of the cooling liquid in the reservoir-radiator.

In view of the foregoing description of the apparatus and operation thereof, it will be apparent that my self-contained controller is particularly adapted for use with searchlights or light projectors which are located at remote points and are subjected to either constant or intermittent operation without constant attendance. One example of an application of this kind is for the measurement of ceiling heights at airports which may be unattended, in which event the controller and its associated projector could be controlled by means of the remote start and stop switches 65 and 66. The controller remains energized at all times and can be exposed to adverse weather conditions for the reason that the thermal relay 63, immersion heater 53 and the motor-operated pump 46 function automatically to maintain the temperature of the cooling liquid above the freezing point. This makes it possible to utilize water as a cooling liquid which is the cheapest and most satisfactory cooling medium for lamps of this kind.

The thermal relay 64 which responds to excessive temperatures and the flow switch 60 provides the necessary protection for the lamp regardless of whether the controller is controlled by an attendant through operation of the start and stop switches 55 and 56 or is controlled from a remote point by switches 65 and 66.

Accordingly, it will be appreciated that my invention provides a compact self-contained controller of such nature as to permit greatly increased utilization of the high efficiencies and light output of the liquid-cooled light sources. The controller is so constituted as to properly control the operation of the lamp and protect it at all times against damage from abnormal operating conditions. In view of the fact that the controller embodies a self-contained circulating system including a reservoir-radiator, it requires no separate source of cooling liquid.

While I have disclosed a specific embodiment of my invention, it will be apparent to those skilled in the art that other modifications thereof may be made without departing from the principles of the invention as disclosed.

I claim as my invention:

1. In combination, a liquid-cooled lamp, means including a motor operated pump for circulating cooling liquid through the lamp, means for initiating operation of the motor-operated pump to establish a flow of cooling liquid, an energizing circuit for the lamp, means including a control switch responsive to the volume of flow of cooling liquid for controlling the said energizing circuit of the lamp, whereby the lamp is energized and de-energized in accordance with the volume of flow of cooling liquid, and temperature-responsive means operable to de-energize the control switch to de-energize the lamp in the event that the temperature of the cooling liquid exceeds a predetermined maximum value.

2. In combination, a liquid-cooled lamp, a system for circulating cooling liquid through said lamp, said system including a reservoir-radiator and a motor-operated pump, control switch means operable to energize the motor-operated pump, an energizing circuit for the lamp, switch means including a control switch responsive to the flow of cooling liquid for closing said energizing circuit to effect energization of the lamp, an electric heater device mounted in said radiator-reservoir, an energizing circuit for said heater, thermal switch means operable in response to a predetermined minimum temperature of the cooling liquid for closing the energizing circuit of said electric heater, and relay means responsive to the closure of said thermal switch means operable to cause said switch means to open the energizing circuit for the lamp and to establish an energizing circuit for the motor-operated pump.

3. In combination, a liquid-cooled lamp, a system for circulating cooling liquid through said lamp, said system including a reservoir-radiator and a motor-operated pump, an energizing circuit for the pump, control switch means operable to close said energizing circuit for the motor-operated pump, an energizing circuit for the lamp, switch means responsive to the flow of cooling liquid operable to close the lamp energizing circuit, an electric heater device mounted in said radiator-reservoir, an energizing circuit for said heater, thermal switch means responsive to a predetermined minimum temperature of the cooling liquid for closing said energizing circuit of said electric heater, and additional thermal switch means responsive to a predetrmined maximum temperature of the cooling liquid operable to cause said control switch to open the energizing circuit of the lamp.

4. In combination, a liquid-cooled lamp, a motor-operated pump for circulating cooling liquid through the lamp, an energizing circuit for said pump, switch means operable to close said circuit to initially energize the motor-operated pump, an energizing circuit for the lamp, a control switch operable to control said energizing circuit, said control switch also being operable to establish an auxiliary energizing circuit for the pump to permit release of said switch means, a flow switch operable in response to a predetermined volume of flow of cooling liquid to effect energization of the control switch to effect closure of the energizing circuit of the lamp, and thermostatic switch means operable to effect deenergization of the control switch and to establish another auxiliary energizing circuit for the motor-operated pump in response to a predetermined increase in the temperature of the cooling liquid, thereby to effect deenergization of the lamp and maintain the pump in operation.

5. In combination, a liquid-cooled lamp, a circulating system for cooling liquid connected to said lamp, said circulating system including an electrically-operated pump, circuit means for connecting the lamp to a current source, said circuit means including flow switch means responsive to volume of flow of said cooling liquid and control switch means controlled thereby, circuit means for controlling the operation of the electrically-operated pump, said circuit means including manual switch means operable to initiate operation of the pump and additional switch means responsive to a predetermined maximum temperature of the cooling liquid operable to de-energize the control switch means and to establish an auxiliary energizing circuit to maintain the electrically-operated pump in operation until the temperature of the cooling liquid decreases below said predetermined value.

6. In combination, a liquid-cooled lamp, a transformer having its secondary winding connected to the lamp and its primary winding disposed for connection to a current source, a circulating system for cooling liquid connected to the lamp, said system including an electrically-operated pump and a flow switch, an energizing circuit for the electrically-operated pump, control switch means operable to close said energizing circuit to effect the energization of the electrically-operated pump, first relay means responsive to the closure of the flow switch in response to a predetermined volume of flow of the cooling liquid for connecting the primary winding of the transformer to the current source, and second relay means responsive to the flow of current through the primary winding of the transformer operable to establish a holding circuit for maintaining the electrically-operated pump and first relay means energized to permit the control switch means to be released.

7. In combination, a liquid-cooled lamp, a transformer having its secondary winding connected to the lamp and its primary winding disposed for connection to a current source, a circulating system for cooling liquid connected to the lamp, said system including an electrically-operated pump and a flow switch, an energizing circuit for the electrically-operated pump, control switch means operable to close said energizing circuit to effect the energization of the electrically-operated pump, first relay means responsive to the closure of the flow switch in response to a predetermined volume of flow of the cooling liquid for connecting the primary winding of the transformer to the current source, second relay means responsive to the flow of current through the primary winding of the transformer operable to establish a holding circuit for maintaining the electrically-operated pump and first relay means energized to permit the control switch means to be released, and means responsive to the increase in temperature of the cooling liquid operable to deenergize said first relay means to disconnect the primary winding of the transformer from the current source.

8. In combination, a liquid-cooled lamp, a transformer having its secondary winding connected to the lamp and its primary winding disposed for connection to a current source, a circulating system for cooling liquid connected to the lamp, said system including an electrically-operated pump and a flow switch, an energizing circuit for the electrically-operated pump, control switch means operable to close said energizing circuit to effect the energization of the electrically-operated pump, first relay means operable to control the connection of the primary winding of the transformer to the current source, an energizing circuit for said first relay means, said flow switch being operable to close said energizing circuit in response to a predetermined volume of flow of the cooling liquid, second relay means responsive to the flow of current through the primary winding of the transformer operable to establish a holding circuit for maintaining the electrically-operated pump and first relay means energized to permit the control switch means to be released, and means responsive to the temperature of the cooling liquid operable to open the energizing circuit of the first relay means for preventing energization of said first relay means in response to the closure of the flow switch in the event that the temperature of the cooling liquid is below a predetermined value.

9. A self-contained controller for liquid-cooled lamps comprising, a housing having a back wall, a dish-shaped member attached to said back wall and forming therewith a reservoir for cooling liquid, a circulating system including connections for attachment to the lamp and said reservoir, a motor-operated circulating pump mounted within the housing for circulating the cooling liquid through the circulating system, a control switch mounted within the housing operable to control the energization of the lamp, a flow switch mounted within the housing and connected in the circulating system for controlling the operation of the control switch in accordance with the flow of cooling liquid, manually-operable switch means mounted within the housing for controlling the energization of the motor-operated pump, and temperature responsive switch means also mounted within the housing for controlling the energization of the motor-operated pump independently of the manually-operable switch means.

10. A self-contained controller for liquid-cooled lamps comprising, a controller housing provided with a hinged door and having a back wall, a dish-shaped radiator housing attached to the back wall and forming therewith a radiator-reservoir for cooling liquid, a circulating system connected with the radiator-reservoir including a plurality of conduits disposed to be attached to the lamp and a motor-operated circulating pump, a control switch mounted within the housing operable to control the energization of the lamp, a flow switch connected in the circulating system for controlling the operation of the control switch, an electric heater mounted within the controller housing to extend into the radiator-reservoir, and a thermal switch mounted within the controller housing for controlling the energization of the heater.

11. A self-contained controller for use with a liquid-cooled lamp comprising, a box-like controller housing having a radiator-reservoir compartment for cooling liquid, a circulating system including a plurality of conduits for attachment to the lamp and a motor-operated pump mounted within the housing and connected to the radiator-reservoir compartment, an electric heater mounted in said compartment for heating the cooling liquid, circuit means for connecting the motor-operated pump and heater to a current source, and thermal responsive control means mounted within the housing operable to control said circuit means to control the energization of the heater and motor-operated pump in accordance with predetermined temperature conditions of the cooling liquid.

12. A self-contained controller for use with a liquid-cooled lamp comprising, a box-like controller housing having a radiator-reservoir compartment, a circulating system including a motor-operated pump mounted within the housing and connected to the radiator-reservoir compartment, circuit means within the housing operable when energized to initiate operation of the motor-operated pump, a control switch mounted within the housing operable to control the energization of the lamp, an energizing circuit for the control switch, a flow switch disposed in the circulating system operable to close said energizing circuit for the control switch in response to a predetermined flow of cooling liquid, and thermal switch means operable in response to predetermined temperature conditions of the cooling liquid to interrupt the energizing circuit for the control switch and to maintain the circuit means for the motor-operated pump energized so as to maintain said pump in operation.

13. A self-contained controller and cooling unit for use with liquid-cooled lamps comprising, a box-like controller housing having a front door and a back wall, a lamp energizing circuit within the housing disposed for connection with the lamp, a dish-shaped housing secured to the outside of the back wall and forming therewith a radiator-reservoir, a liquid circulating system including an electrically-operated circulating pump and a flow switch mounted within the controller housing and connected to the radiator-reservoir, said circulating system having inlet and outlet connections extending out of the controller housing for connection to a lamp, a control switch mounted within the housing responsive to said flow switch for controlling said lamp energizing circuit, an electric heater mounted within the controller housing in heating relation with the cooling liquid, a thermal switch mounted within the controller housing for controlling the energization of the heater, an energizing circuit mounted within the controller housing for the electrically-operated pump, switch means operable to close said energizing circuit to initiate the operation of the pump, and relay means within the housing controlled by said thermal switch for initiating operation of the pump independently of said switch means.

WILLIS A. PENNOW.